(12) United States Patent
Chang et al.

(10) Patent No.: US 11,598,405 B1
(45) Date of Patent: Mar. 7, 2023

(54) PLANETARY REDUCER

(71) Applicant: Sanwa Engineering Corp., Xionglin Township (TW)

(72) Inventors: Li-Ping Chang, Xionglin Township (TW); Ching-Yu Hsiao, Xionglin Township (TW)

(73) Assignee: Sanwa Engineering Corp., Xionglin Township (TW)

( * ) Notice: Subject to any disclaimer, the term of this patent is extended or adjusted under 35 U.S.C. 154(b) by 0 days.

(21) Appl. No.: 17/537,782

(22) Filed: Nov. 30, 2021

(51) Int. Cl.
*F16H 57/01* (2012.01)
*F16H 57/08* (2006.01)
*F16H 1/28* (2006.01)

(52) U.S. Cl.
CPC ............. *F16H 57/01* (2013.01); *F16H 57/08* (2013.01); *F16H 2001/2881* (2013.01); *F16H 2057/012* (2013.01)

(58) Field of Classification Search
CPC ..... F16H 2057/012; F16H 57/01; F16H 57/08
See application file for complete search history.

(56) References Cited

U.S. PATENT DOCUMENTS

| | | | |
|---|---|---|---|
| 9,482,316 B2* | 11/2016 | Kurth | F16H 1/46 |
| 10,788,394 B2* | 9/2020 | Sibbach | B25J 9/1687 |
| 2019/0174207 A1* | 6/2019 | Cella | H04Q 9/00 |
| 2021/0388736 A1* | 12/2021 | Adhiachari | B64F 5/40 |

FOREIGN PATENT DOCUMENTS

TW M571919 12/2018

* cited by examiner

*Primary Examiner* — Erin D Bishop
(74) *Attorney, Agent, or Firm* — Karin L. Williams; Alan D. Kamrath; Mayer & Williams PC

(57) ABSTRACT

A planetary reducer contains: a sun gear rod, a gear assembly, a first external gear, and a second external gear. The sun gear rod includes an extension and a toothed section. The gear assembly includes a post, a first planetary gear, and a second planetary gear. Some of multiple teeth of the first planetary gear and some of multiple teeth of the second planetary gear expose outside the post. A number of the multiple teeth of the first planetary gear is different from a number of the multiple teeth of the second planetary gear. The first external gear includes a first surrounding portion and a first toothed portion which meshes with the first planetary gear. The second external gear includes a second surrounding portion and a second toothed portion which meshes with the second planetary gear.

5 Claims, 3 Drawing Sheets

PLANETARY REDUCER

FIELD OF THE INVENTION

The present invention relates to a reducer, and more particularly to a planetary reducer.

BACKGROUND OF THE INVENTION

A planetary gear is a part of a gearing structure and rotates along a sun gear. An external gear is fitted on an outer wall of the planetary gear and moves with the planetary gear.

A conventional planetary reducer is disclosed in TW M571919 and contains: an input shaft, an output shaft, and an input bearing. The output shaft has a receiving groove, and the input shaft is fitted on the output shaft and accommodated in the receiving groove. The input bearing abuts against the output shaft and the input shaft so as to enhance concentricity of the output shaft and the input shaft of the planetary reducer, thus obtaining easy connection of the output shaft and the input shaft.

When desiring to output a larger reduction ratio of the planetary reducer, a ratio of gears has to be changed, thus increasing a size of the conventional planetary reducer.

The present invention has arisen to mitigate and/or obviate the afore-described disadvantages.

SUMMARY OF THE INVENTION

One aspect of the present invention is to provide a planetary reducer which is capable of overcoming the shortcomings of the planetary reducer.

To obtain the above aspect, a planetary reducer provided by the present invention contain: a sun gear rod, a gear assembly, a first external gear, and a second external gear.

The sun gear rod includes an extension and a toothed section which surrounds a first end of the extension.

The gear assembly includes a post, a first planetary gear, and a second planetary gear. The first planetary gear and the second planetary gear are accommodated in the post, some of multiple teeth of the first planetary gear and some of multiple teeth of the second planetary gear expose outside the post, and a number of the multiple teeth of the first planetary gear is different from a number of the multiple teeth of the second planetary gear. An end of the sun gear rod is received in the post, and the toothed section meshes with the first planetary gear and the second planetary gear.

A first external gear is fitted on the first planetary gear and includes a first surrounding portion and a first toothed portion formed on an inner wall of the first surrounding portion and meshing with the first planetary gear.

The second external gear is fitted on the second planetary gear and includes a second surrounding portion and a second toothed portion formed on an inner wall of the second surrounding portion and meshing with the second planetary gear.

Thereby, the sun gear rod, the post, the first planetary gear and the first external gear define a first planetary reduction mechanism. The sun gear rod, the post, the second planetary gear, and the second external gear define a second planetary reduction mechanism, wherein the post is an output end of the first planetary reduction mechanism and an input end of the second planetary reduction mechanism, and the second external gear is the output end of the planetary reducer. Furthermore, the sun gear rod, the second planetary gear, and the second external gear define a third planetary reduction mechanism, such that a rotating speed of the sun gear rod is inputted via the first planetary reduction mechanism, the second planetary reduction mechanism, and the third planetary reduction mechanism, thus enhancing a reduction ratio of the planetary reducer greatly. Preferably, the post is used as the output end of the first planetary reduction mechanism and the input end of the second planetary reduction mechanism, thus reducing a size of the planetary reducer.

DETAILED DESCRIPTION OF THE PREFERRED EMBODIMENTS

Figure 1:
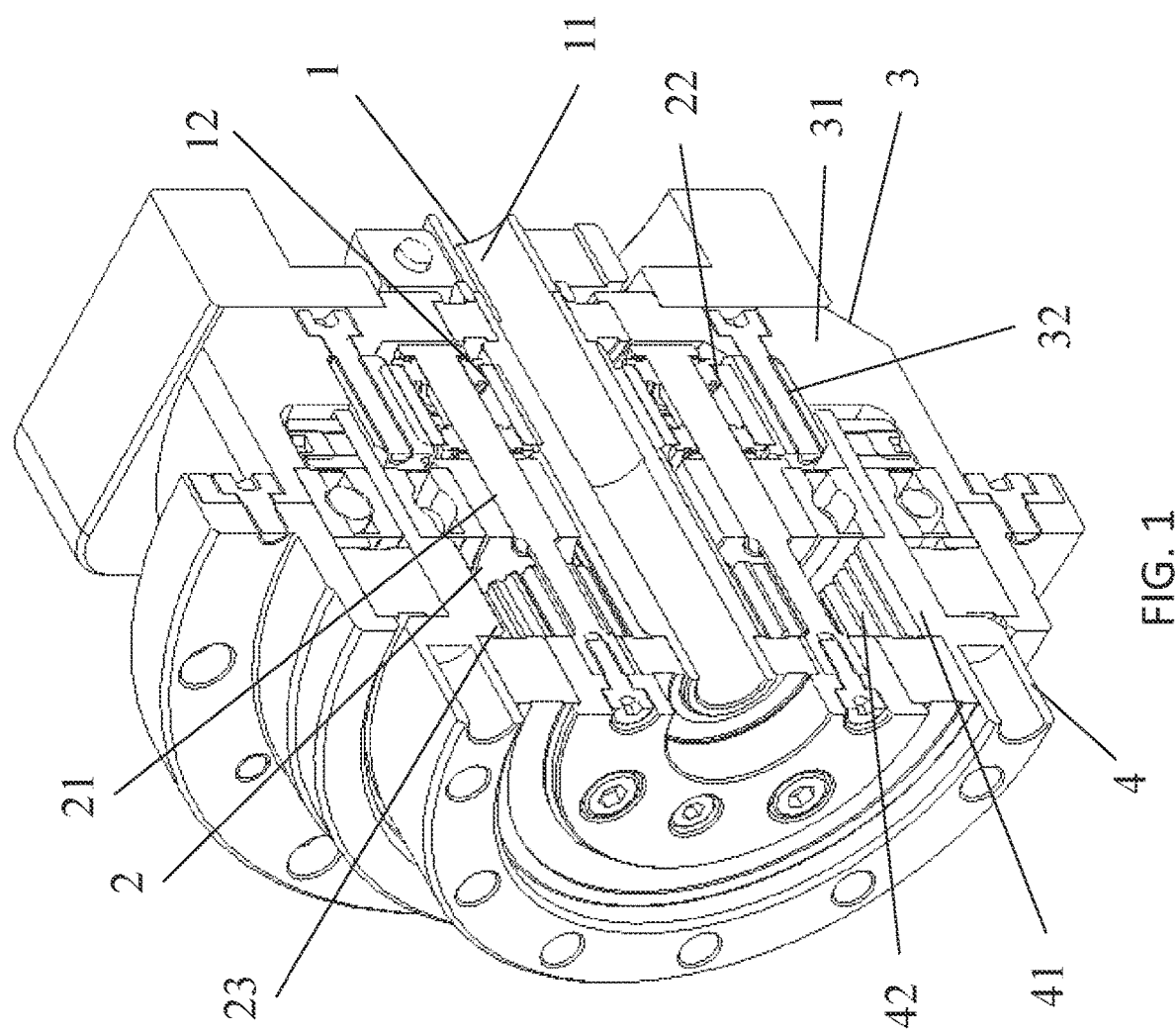
FIG. 1 is a cross sectional view showing the assembly of a part of a planetary reducer according to a preferred embodiment of the present invention.
Figure 2:
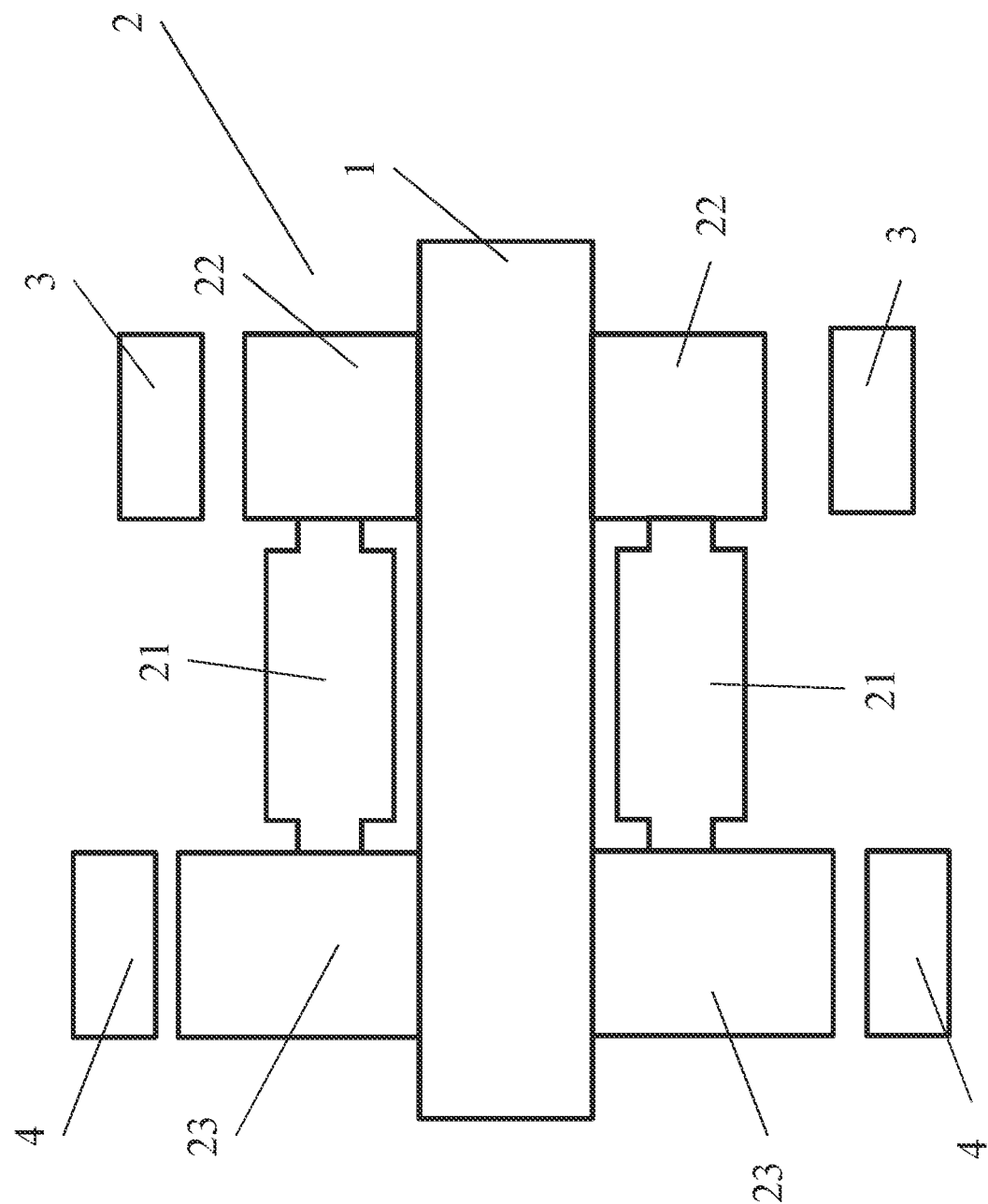
FIG. 2 is a schematic view showing the assembly of the planetary reducer according to the preferred embodiment of the present invention.

With reference to FIG. 1, a planetary reducer according to a preferred embodiment of the present invention comprises:

a sun gear rod 1, as shown in FIGS. 1 and 2, the sun gear rod 1 including an extension 11 and a toothed section 12 which surrounds a first end of the extension 11, and a second end of the extension 11 being configured to connect with an output shaft of a motor;

a gear assembly 2, as shown in FIGS. 1 and 2, the gear assembly 2 including a post 21, a first planetary gear 22, and a second planetary gear 23, the first planetary gear 22 and the second planetary gear 23 are accommodated in the post 21, some of multiple teeth of the first planetary gear 22 and some of multiple teeth of the second planetary gear 23 expose outside the post 21, wherein a number of the multiple teeth of the first planetary gear 22 is different from a number of the multiple teeth of the second planetary gear 23, for example, the number of the multiple teeth of the second planetary gear 23 is more than the number of the multiple teeth of the first planetary gear 22, such that the motor drives the sun gear rod 1 to rotate at a high speed, thus obtaining a great deceleration effect. In one embodiment, the number of the multiple teeth of the first planetary gear 22 and the number of the multiple teeth of the second planetary gear 23 are three. An end of the sun gear rod 1 is received in the post 21, and the toothed section 12 meshes with the first planetary gear 22 and the second planetary gear 23.

Each of the first planetary gear 22 and the second planetary gear 23 has a first color layer so that a thickness of the first color is configured to distinguish an abrasion of each of the first planetary gear 22 and the second planetary gear 23. The post 21 is made of transparent material so as to be observed by a user easily. Each of the first planetary gear 22 and the second planetary gear 23 further has a second color layer stacked on the first color layer, wherein a color of the first color layer is different from a color of the second color layer, thus obtaining outstanding distinction. For example, the color of the second color layer is green to represent that each of the first planetary gear 22 and the second planetary gear 23 is not worn greatly. When the first color layer of each of the first planetary gear 22 and the second planetary gear 23 is exposed, it denotes that the first planetary gear 22 and the second planetary gear 23 have to be replaced because of a great abrasion, thus obtaining a smooth operation of the planetary reducer.

The planetary reducer further comprises:

a first external gear 3, as shown in FIGS. 1 and 2, the first external gear 3 being fitted on the first planetary gear 22 and including a first surrounding portion 31 and a first toothed portion 32 formed on an inner wall of the first surrounding portion 31 and meshing with the first planetary gear 22. The first toothed portion 32 has a third color layer which is the same as the first color layer and/or the second color layer of each of the first planetary gear 22 and the second planetary gear 23, so further remarks of the third color layer of the first toothed portion 32 are omitted. The first surrounding portion 31 is made of transparent so as to be observed by the user easily. It is to be noted that a first planetary reduction mechanism is defined by the sun gear rod 1, the post 21, the first planetary gear 22, and the first external gear 3, wherein the sun gear rod 1 of the first planetary reduction mechanism is used as an input of the rotating speed of the planetary reducer, and the post 21 of the first planetary reduction mechanism is used as an output of the rotating speed of the planetary reducer.

The planetary reducer further comprises:

a second external gear 4, as shown in FIG. 1, the second external gear 4 being fitted on the second planetary gear 23 and including a second surrounding portion 41 and a second toothed portion 42 formed on an inner wall of the second surrounding portion 41 and meshing with the second planetary gear 23. The second toothed portion 42 has a fourth color layer which is the same as the first color layer and/or the second color layer of each of the first planetary gear 22 and the second planetary gear 23, so further remarks of the third color layer of the first toothed portion 32 are omitted. The second surrounding portion 41 is made of transparent material so as to be observed by the user easily. It is to be noted that a second planetary reduction mechanism is defined by the post 21, the second planetary gear 23, and the second external gear 4, wherein the post 21 of the first planetary reduction mechanism is used as an input of the rotating speed of the planetary reducer, and the second external gear 4 of the second planetary reduction mechanism is used as an output of the rotating speed of the planetary reducer.

In operation, the sun gear rod 1 is connected with an output end of the motor, the second external gear 4 is connected with a driven element, and the first external gear 3 is fixed. When the motor rotates to drive the sun gear rod 1 to revolve, the sun gear rod 1 rotates to actuate the first planetary gear 22 to revolve. Since the first external gear 3 is fixed, the first planetary gear 22 rotates along the first toothed portion 32. Because the first planetary gear 22 is rotatably connected with the post 21, when the first planetary gear 22 revolves along the first toothed portion 32 to produce an orbital revolution, the post 21 rotates itself. Thereby, the first planetary reduction mechanism is defined by the sun gear rod 1, the post 21, the first planetary gear 22, and the first external gear 3, wherein the sun gear rod 1 of the first planetary reduction mechanism is used as the input of the rotating speed of the planetary reducer, and the post 21 of the first planetary reduction mechanism is used as the output of the rotating speed of the planetary reducer.

When the post 21 rotates to actuate the second planetary gear 23 to move along the second external gear 42, the second external gear 4 is driven by the second planetary gear 23, such that the second external gear 4 changes to the output of the rotating speed of the planetary reducer, and the driven element is actuated by the second external gear 4 to revolve. Thereby, the second planetary reduction mechanism is defined by the post 21, the second planetary gear 23, and the second external gear 4, wherein the post 21 of the first planetary reduction mechanism is used as the input of the rotating speed of the planetary reducer, and the second external gear 4 of the second planetary reduction mechanism is used as the output of the rotating speed of the planetary reducer. Since the second planetary gear 23 meshes with the sun gear rod 1, when the sun gear rod 1 rotates to actuate the first planetary gear 22 to revolve, the second planetary gear 23 is driven by the sun gear rod 1 to rotate, such that the sun gear rod 1 and the post 21 actuate the first planetary gear 22 and the second planetary gear 23 to rotate. Thereby, the sun gear rod 1, the second planetary gear 23, and the second external gear 4 define a third planetary reduction mechanism, and the second external gear 4 is actuated by the second planetary reduction mechanism and the third planetary reduction mechanism to enhance deceleration effectively.

Accordingly, the post 21, the first planetary gear 22, the second planetary gear 23, and the sun gear rod 1 are connected so that the post 21 is used as the output and the input of the rotating speed of the planetary reducer, thus reducing a size of the planetary reducer. Furthermore, the second planetary reduction mechanism and the third planetary reduction mechanism mate with each other to obtain a great output of a reduction ratio of the planetary reducer. Preferably, related components of the planetary reducer are connected changeably based on using requirements. For example, the second external gear 4 is connected with the motor, and the sun gear rod 1 is connected with the driven element.

Figure 3:
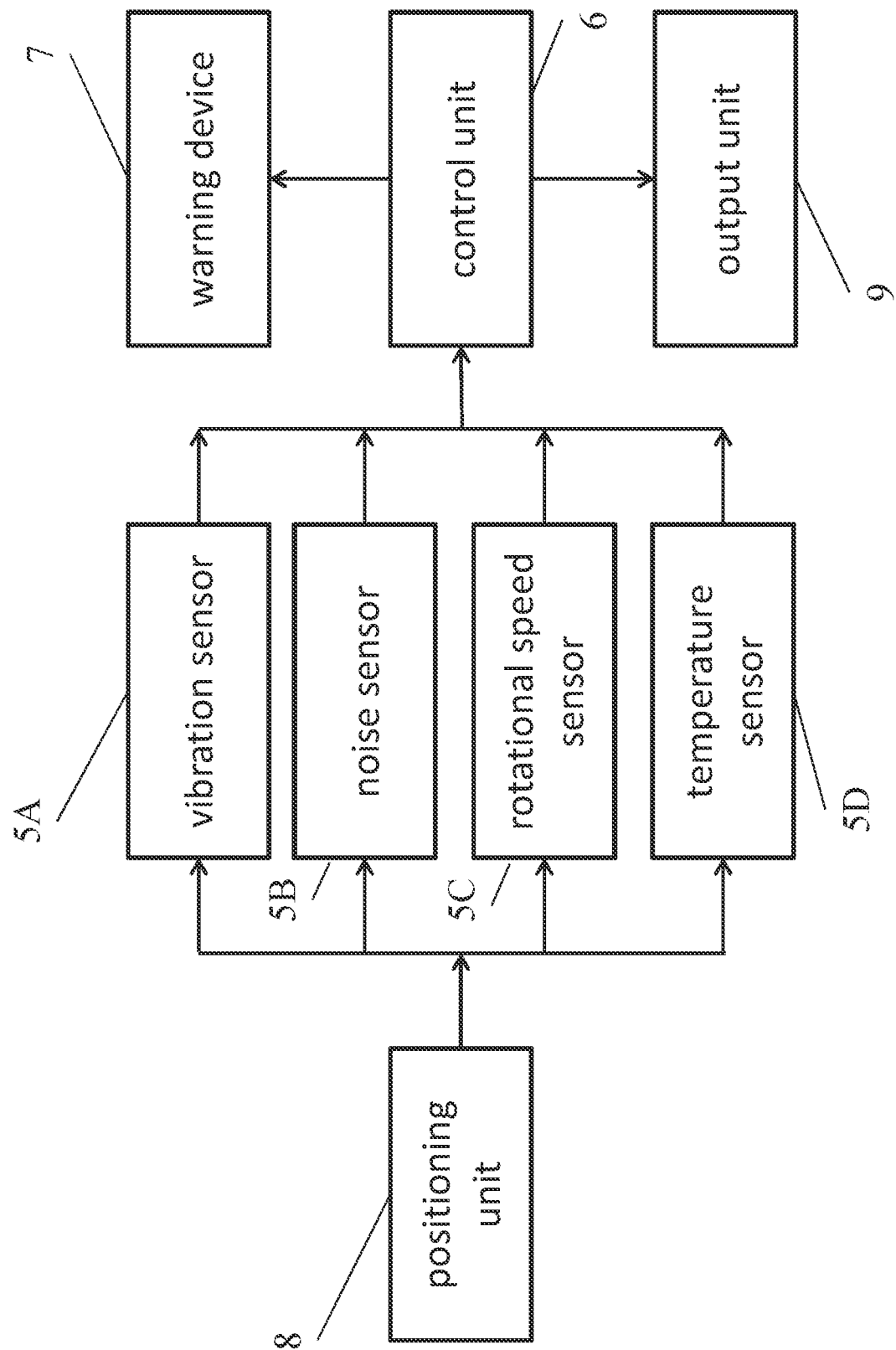
FIG. 3 is a schematic view showing the operation of the planetary reducer according to the preferred embodiment of the present invention.

To avoid damage of the planetary reducer, the planetary reducer is monitored to execute maintenance. For instance, before the sun gear, the first planetary gear, the second planetary gear, the first external gear, and the second external gear are broken to cause irregular vibration, they are monitored to be maintained, repaired, and replaced. Referring to FIG. 3, a vibration sensor 5A is mounted outside the first external gear 3 and is remotely connected with a control unit 6 so as to send a sensing result to a control unit 6, and the control unit 6 judges the sensing result. Thereby, when the sensing result is more than a first value, the control unit 6 judges whether the sun gear, the first planetary gear, the second planetary gear, the first external gear, and the second external gear have to be maintained, repaired, and replaced based on the first value, wherein the first value is a set proportion or a set number. Thereafter, the control unit 6 controls a warning device 7 to emit lights or to display a warning signal in a display screen, thus repairing, maintaining or replacing the planetary reducer.

In application, at least one planetary reduction mechanism is mounted in one planetary reducer of a factory, so when desiring to learn which one of the at least one planetary reduction mechanism has to be maintained, repaired, and replaced, the vibration sensor 5A includes positioning data so that when sending the sensing result, the positioning data of the vibration sensor 5A is sent as well. Then, the control unit 6 represents the positioning data via the warning device 7, and a position of each of the at least one planetary reduction mechanism is learned exactly. The positioning data is any one of a coordinate, a number, a name, and a map of each planetary reduction mechanism. When the positioning data is the coordinate, the planetary reducer further comprises a positioning unit 8 disposed outside the first external gear 3 and configured to send the positioning result to the vibration sensor 5A to be used as the positioning data.

The vibration of each planetary reducer is configured to judge whether each planetary is maintained, repaired, and replaced. Preferably, noises are applied to judge whether each planetary is maintained, repaired, and replaced. For example, a noise sensor 5B is fixed outside the first external gear 3, wherein the noise sensor 5B is remotely connected with the control unit 6 so that when the control unit 6 judges a sensing result of the noise sensor 5B is more than a second value, the warning device 7 is controlled by the control unit 6 to operate. To distinguish a position of each planetary reduction mechanism, the positioning data is stored in the noise sensor 5B from the positioning unit 8. To reduce a judgment error, the control unit 6 judges whether the planetary reducer has to be maintained, repaired, and replaced, when the sensing results of the noise sensor and the vibration sensor are more than the first value and the second values, thus enhancing judgment accuracy. Preferably, the sensing results of the noise sensor and the vibration sensor are stored and are learned by an artificial intelligence to update the first value and the second value, thus enhancing the judgment accuracy.

A rotational speed sensor 5C is arranged outside the first external gear 3 and is configured to sense rotating speeds of the sun gear rod 1 and the second external gear 4. The control unit 6 is remotely connected with the rotational speed sensor 5C and is configured to analyze and to send residual life data sensed by the rotational speed sensor 5C toward an output unit 9, wherein the output unit 9 is configured to represent the residual life data, and the output unit 9 is a display screen or a printer. The residual life data is analyzed by judging duration of a high-speed rotation of the planetary reducer, for example, a service life of the planetary reducer is reduced greatly when the planetary reducer operates at a maximum output speed or close to the maximum input speed, such that the control unit 6 analyzes the service life exactly. When a predetermined service life of the planetary reducer is a period of using time of the planetary reducer at an input speed value, the input speed value times the period of using time to judge the residual life data of the planetary reducer, hence the control unit 6 calculates the residual life data of the planetary reducer exactly. Ambient temperature affects a deterioration rate of lubricating oil, and a lubricating effect of the lubricating oil is very important for the planetary reducer, so a temperature sensor 5D is arranged outside the first external gear 3 and is remotely connected with the control unit 6 so that the control unit 6 analyzes a sensing result of the temperature sensor 5D. The sensing result of the temperature sensor 5D is a range of a temperature at which the planetary reducer operates for the period of using time so as to find the lubricating oil which mates with the planetary reducer, and data of the lubricating oil is sent to the output unit. In addition, the control unit 6 calculates deterioration speed of the lubricating oil based on the range of the temperature at which the planetary reducer operates and the duration of the high-speed rotation of the planetary reducer, thus acquiring a replacement time of the lubricating oil.

While the preferred embodiments of the invention have been set forth for the purpose of disclosure, modifications of the disclosed embodiments of the invention as well as other embodiments thereof may occur to those skilled in the art. The scope of the claims should not be limited by the preferred embodiments set forth in the examples, but should be given the broadest interpretation consistent with the description as a whole.

What is claimed is:

1. A planetary reducer comprising:
a sun gear rod including an extension and a toothed section which surrounds a first end of the extension;
a gear assembly including a post, a first planetary gear, and a second planetary gear, the first planetary gear and the second planetary gear being accommodated on the post, wherein a number of the multiple teeth of the first planetary gear is different from a number of the multiple teeth of the second planetary gear, an end of the sun gear rod being received on the post, and the toothed section meshing with the first planetary gear and the second planetary gear;
a first external gear fitted on the first planetary gear and including a first surrounding portion and a first toothed portion formed on an inner wall of the first surrounding portion and meshing with the first planetary gear; and
a second external gear fitted on the second planetary gear and including a second surrounding portion and a second toothed portion formed on an inner wall of the second surrounding portion and meshing with the second planetary gear,
wherein the number of the multiple teeth of the first planetary gear is more than the number of the multiple teeth of the second planetary gear,
wherein a vibration sensor is mounted outside the first external gear and is remotely connected with a control unit so that the control unit controls a warning device to operate, when judging a sensing result is more than a first value,
wherein a noise sensor is remotely connected with the control unit so that when the control unit judges a sensing result of the noise sensor is more than a second value, the warning device is controlled by the control unit to operate,
wherein a temperature sensor is arranged outside the first external gear and is remotely connected with the control unit so that the control unit analyzes a sensing result of the temperature sensor to find a data of a lubricating oil, and the data of the lubricating oil is sent to an output unit, and
wherein a rotational speed sensor is arranged outside the first external gear and is configured to sense rotating speeds of the sun gear rod and the second external gear; the control unit is remotely connected with the rotational speed sensor and is configured to analyze and to send residual life data sensed by the rotational speed sensor toward the output unit.

2. The planetary reducer as claimed in claim 1, wherein the post is made of transparent material; the first planetary gear, the second planetary gear, the toothed section, the first external gear, and the second external gear have a first color layer.

3. The planetary reducer as claimed in claim 2, wherein a second color layer is stacked on the first color layer, and a color of the first color layer is different from a color of the second color layer.

4. The planetary reducer as claimed in claim 3, wherein the vibration sensor, the noise sensor, the temperature sensor, and the rotational speed sensor include positioning data so that the positioning data of the vibration sensor, the noise sensor, the temperature sensor and the rotational speed sensor is sent to the control unit with the sensed result of the vibration sensor, the noise sensor, the temperature sensor and the rotational speed sensor, when the sensing results are sensed.

5. The planetary reducer as claimed in claim 4, wherein the planetary reducer further comprises a positioning unit 8 disposed outside the first external gear and configured to send a positioning result of the planetary reducer to the vibration sensor, the noise sensor, the temperature sensor and the rotational speed sensor.

\* \* \* \* \*